(12) United States Patent
Wang et al.

(10) Patent No.: US 10,866,890 B2
(45) Date of Patent: Dec. 15, 2020

(54) METHOD AND APPARATUS FOR IMPLEMENTING LOCK-FREE DATA STRUCTURES

(71) Applicant: Arm Limited, Cambridge (GB)

(72) Inventors: Wei Wang, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 108 days.

(21) Appl. No.: 16/183,201

(22) Filed: Nov. 7, 2018

(65) Prior Publication Data

US 2020/0142829 A1 May 7, 2020

(51) Int. Cl.
*G06F 11/00* (2006.01)
*G06F 12/0804* (2016.01)
*G06F 11/07* (2006.01)

(52) U.S. Cl.
CPC ........ *G06F 12/0804* (2013.01); *G06F 11/073* (2013.01); *G06F 11/0751* (2013.01); *G06F 11/0793* (2013.01); *G06F 2212/1032* (2013.01); *G06F 2212/205* (2013.01)

(58) Field of Classification Search
CPC ............... G06F 11/073; G06F 11/0751; G06F 11/0793; G06F 12/0804
See application file for complete search history.

(56) References Cited

U.S. PATENT DOCUMENTS

| 2010/0250833 | A1* | 9/2010 | Trika | G06F 12/0246 711/103 |
| 2012/0030408 | A1* | 2/2012 | Flynn | G06F 3/0688 711/102 |
| 2013/0166820 | A1* | 6/2013 | Batwara | G06F 12/0246 711/103 |

(Continued)

FOREIGN PATENT DOCUMENTS

| WO | 2014142908 A1 | 9/2014 |
| WO | 2016160035 A1 | 10/2016 |

OTHER PUBLICATIONS

Wang, Tianzheng & Levandoski, Justin & Larson, Per-Åke, Easy Lock-Free Indexing in Non-Volatile Memory, IEEE 34th International Conference on Data Engineering (ICDE), 2018, 461-472.

(Continued)

*Primary Examiner* — Joshua P Lottich
(74) *Attorney, Agent, or Firm* — Leveque IP Law, P.C.

(57) ABSTRACT

An instruction set architecture of a data processing system includes one or more persistent atomic instructions that provide failure-safe atomicity. When issued, a sequence of operations associated with the persistent atomic instruction are performed and first data, associated with a first address in a persistent memory of the data processing system, is written to a point of persistence in the data processing system. Access to data associated with the first address is controlled such that the first data is not available to other execution threads of the data processing system until (Continued)

completion of writing the first data to the point of persistence. The point of persistence may be the persistent memory itself or a persist buffer. The persist buffer may be a volatile or non-volatile buffer. One or more monitors may control access to data at memory addresses dependent upon a designated state of exclusivity.

21 Claims, 5 Drawing Sheets

(56) References Cited

U.S. PATENT DOCUMENTS

| | | | |
|---|---|---|---|
| 2013/0275656 A1* | 10/2013 | Talagala | G06F 12/0246 |
| | | | 711/103 |
| 2014/0068183 A1* | 3/2014 | Joshi | G06F 3/0671 |
| | | | 711/114 |
| 2014/0281269 A1 | 9/2014 | Chakrabarti et al. | |
| 2014/0365734 A1 | 12/2014 | Bridge, Jr. et al. | |
| 2018/0137052 A1* | 5/2018 | Boyle | G06F 12/084 |
| 2019/0258508 A1* | 8/2019 | Marathe | G06F 12/0804 |
| 2019/0384837 A1* | 12/2019 | Kumar | G06F 12/126 |

OTHER PUBLICATIONS

John D. Valois, Lock-free linked lists using compare-and-swap, PODC '95 Proceedings of the 14th annual ACM symposium on Principles of distributed computing, Aug. 20-23, 1995, pp. 214.222.

\* cited by examiner

METHOD AND APPARATUS FOR IMPLEMENTING LOCK-FREE DATA STRUCTURES

TECHNICAL FIELD

The present disclosure relates to an instruction set architecture (ISA) for a data processing apparatus that facilitates the implementation of failure-safe, lock-free data structures. The implementation may be used with persistent memories, for example.

BACKGROUND

A data processing system may execute multiple processing threads or processes concurrently that access one or more shared memory resources. In such situations, mechanisms must be used in order to maintain data consistency. For example, a coherence controller may be used to ensure that copies of data held in caches are up to date. An alternative approach is the use of a lock, such as a mutex ( mutual exclusion), that limits access to a region of shared memory to a single thread while an operation is completed. However, a major disadvantage of this approach is that all other threads wishing to access the same shared memory are stalled until the lock is released.

A still further approach is the use of atomic instructions. An atomic operation is one that is indivisible or uninterruptable by other execution threads, processes, interrupts or signals. These atomic instructions may be defined in an instruction set architecture. The instruction set architecture is implemented by a data processing system that provides a means for executing machine instructions that operate on defined data types or control the state of the data processing system (as maintained in registers, main memory, and other memory resources, for example).

However, coherence controller, locks and atomic instructions generally operate with respect to virtual memory and are only sufficient when normal operation is not interrupted by a fault, such as a power failure. In the event of a power failure, the state of the system is determined by the state of the persistent memory. This can be a significant problem since some cached data may not have been written back to persistent memory.

Data inconsistency can occur, for example, when, as a result of power failure for example, a data value used to compute a result is not saved while the result is saved.

One example is where data is stored in the form of a linked list, data tree or other data structure. Such data structures are defined by links between nodes. If a link is broken, for example when a power failure occurs during insertion or deletion of a node, an entire region of the data structure may be corrupted.

There exists a need, therefore, for a mechanism that preserves data consistency in the event of a power failure or other fault.

DETAILED DESCRIPTION OF THE EMBODIMENTS

Figure 1:
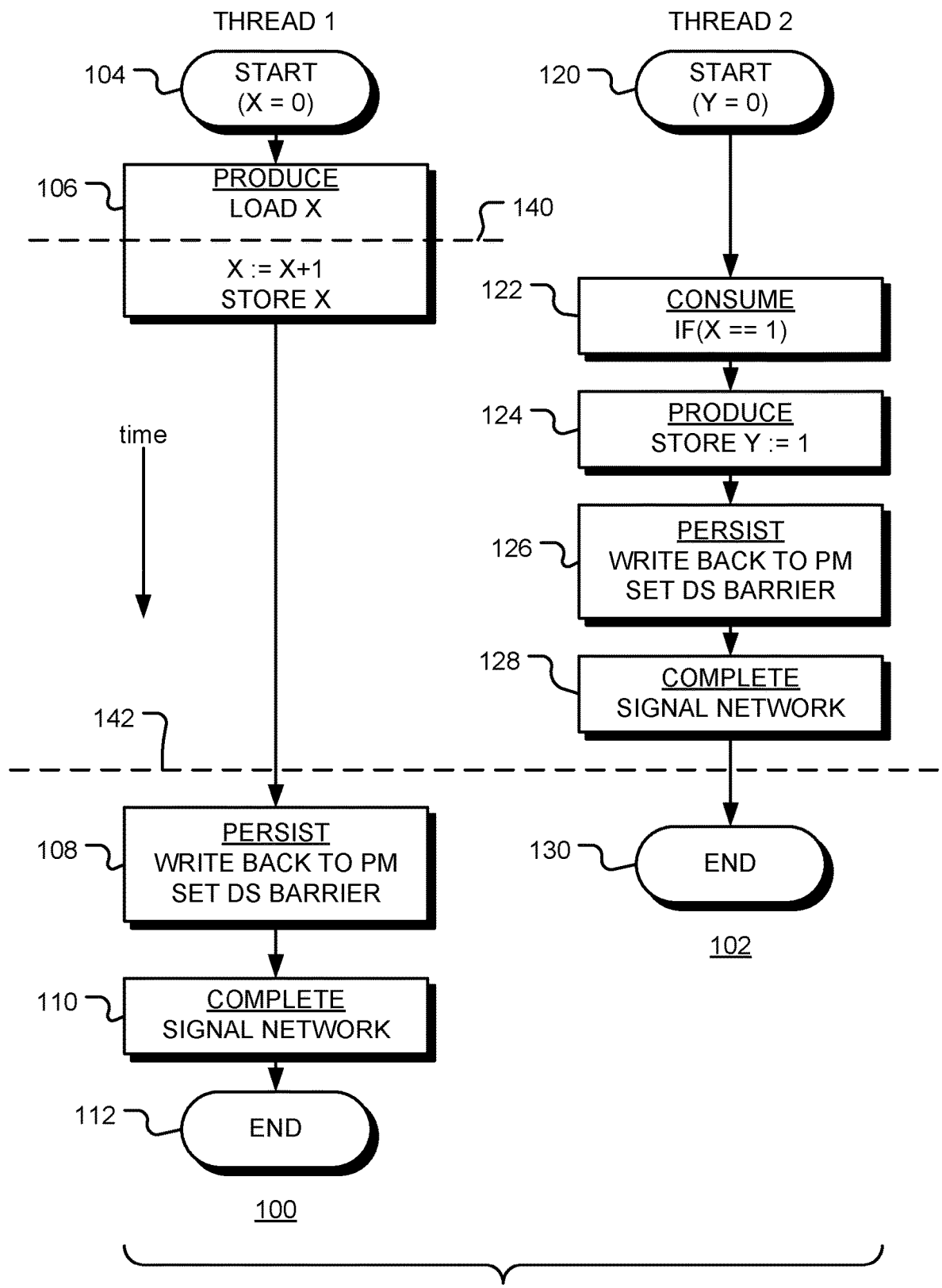
FIG. 1 is a diagrammatic representation of operations performed by two execution threads in a data processing system that utilizes persistent memory.

While the disclosed apparatus and devices are susceptible of embodiment in many different forms, there is shown in the drawings and will herein be described in detail specific embodiments, with the understanding that the present disclosure is to be considered as an example of the principles and not intended to limit the principles to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The present disclosure is related to a mechanism for failure-safe storage of data to a persistent memory in a data processing having multiple execution threads and/or processes that access a common data resource.

An instruction set architecture of a data processing system is disclosed that includes one or more persistent atomic instructions that provide failure-safe atomicity. When issued, a sequence of operations associated with the persistent atomic instruction are performed and first data, associated with a first address in a persistent memory of the data processing system, is written to a point of persistence in the data processing system. Access to data associated with the first address is controlled such that the first data is not available to other execution threads of the data processing system until completion of writing the first data to the point of persistence. The point of persistence may be the persistent memory itself or a persist buffer. The persist buffer may be a volatile or non-volatile buffer. One or more monitors may control access to data at memory addresses dependent upon a designated state of exclusivity.

Herein, the term 'persistent memory' shall mean any memory the contents of which are available after a power cycle or other reboot. 'Persistent memory' shall include non-volatile memory such as core memory, flash memory, magneto-resistive random access memory (MRAM), ferroelectric RAM (F-RAM), phase-change RAM (PCRAM), resistive RAM (ReRAM), correlated-electron RAM (Ce-RAM) and other memory technologies that are inherently non-volatile. In addition, 'persistent memory' shall include main memory that is automatically backed-up up to non-volatile memory (such as flash memory) and reloaded following a power cycle. For example, non-volatile, dual inline memory module (NVDIMM-N) combines a DIMM, DRAM, flash storage and small power supply in the same module.

Herein, an atomic instruction is one that is indivisible or uninterruptable by other execution threads, processes, interrupts or signals. A persistent atomic instruction is an atomic instruction that, in addition, is indivisible by a system failure, such as a power supply failure. Such an instruction is termed failure-safe.

An embodiment of the disclosure provides a method performed in response to a persistent atomic instruction issued by a first execution thread in a data processing system, where the persistent atomic instruction associated with a first address in a persistent memory of the data processing system. In response to the persistent atomic instruction, a sequence of actions are performed and first data is written to a point of persistence in the data processing system. The first data is either produced by the sequence of actions or is associated with the persistent atomic instruction. Accesses associated with the first address in the persistent memory are controlled such that the first data is not available to other execution threads of the data processing system until completion of writing the first data to the point of persistence in the data processing system.

An instruction may be executed in hardware as a sequence of operations (sometimes termed micro-operations or micro-ops). Execution of the persistent atomic instruction may include one or more operations such as a store operation, a compare and store operation, a compare and swap operation, a swap operation, a logic operation. an arithmetic operation and an ordering barrier operation.

One application of persistent atomic instructions is the implementation lock-free data structures, where a data structure remains intact in the event of a power failure while the data structure is being updated.

By way of explanation, an example of simple operations performed by two execution threads is shown in FIG. 1, which is a diagrammatic representation of operations performed by two execution threads (THREAD 1 and THREAD 2) in a data processing system that utilizes persistent memory, such as Resistive Random Access Memory (ReRAM), phase change memory (PCM), and spin-transfer torque magnetic RAM (STT-MRAM). Flow 100 illustrates the operations of THREAD 1, with time flowing downwards as indicated by the arrow, while flow 102 illustrates the operations of THREAD 2. At start block 104, a data value X has a value 0 in a persistent memory. At block 106, THREAD 1 produces a new value (1) for X by loading and incrementing the original value and then storing the incremented value. This new value may be stored in a local cache of the processor executing THREAD 1, for example, or in another transient memory. The new value of X is written to persistent memory (PM) (i.e. 'persisted') at block 108. This may be done by cleaning the appropriate line of the local cache or system cache. In addition, a data synchronization barrier or fence is put in place to enable the write-back process to complete before any other thread operations are executed. Optionally, once the write-back has completed, i.e. the data has been persisted, the data processing system may be signaled at block 110. The operation of THREAD 1 ends at block 112.

Turning to operation 102 of the THREAD 2, at start block 120, a data value Y has a value 0 in a persistent memory. At block 122, THREAD 2 reads the value of X and compares it to unity. This value has been set to 1 by THREAD 1, but has not yet been persisted. Thus, THREAD 2 uses or consumes data produced by THREAD 1. If the value of X is equal to 1, THREAD 2 produces a new value for Y at block 124. The new value for Y is persisted at block 126 and, optionally, THREAD 2 may signal completion at block 128. The operation of THREAD 2 ends at block 130.

If both threads complete their operations, the values X=1 and Y=1 are stored in persistent memory. These values will persist, even in the event of a power failure, for example, after completion.

Referring again to FIG. 1, a problem occurs when another thread accesses and changes the value of X at time indicated by broken line 140. A simple solution to this problem is the use of a lock, such as a mutex (mutual exclusion), that limits access to a region of shared memory to a single thread while an operation is completed. However, a disadvantage of this approach is that all other threads wishing to access the same shared memory are stalled until the lock is released. An alternative approach is to replace the STORE instruction in THREAD 1 by an atomic compare-and-swap (CAS) instruction. An atomic operation is one that is indivisible or uninterruptable by other execution threads, processes, interrupts or signals. The atomic CAS instruction checks that value of X has not changed before storing the new value. However, while this approach is thread-safe, it does not solve the problem of data inconsistency as a result of a power failure.

An example of an atomic instruction is a compare-and-swap (CAS) instruction, also referred to as a conditional store instruction, which is known in the art and is defined in some existing instruction sets. The compare-and-swap (CAS) instruction is used to compare a value read at the start of an operation with its current value and, if it hasn't been changed, replace it with a new value. If the read value has changed, the operation may be repeated. This is sometimes referred to as an 'optimistic' approach, since the operation is performed on the chance that the read value hasn't changed. The CAS instruction may be used in a variety of ways. One use of the CAS instruction is for the implementation of data structures, such as linked lists, stacks, etc.

However, a different situation occurs if a power failure were to occur at a time indicated by broken line 142. In this case, the persistent memory will contain the values X=0 and Y=1, which are not consistent (since Y should only be set unity when X is unity). While the CAS instruction allows for data consistency in virtual memory, this simple example shows that the operations are not protected or durable with respect to power failure or other fault that prevents X from being saved to persistent memory. Thus, a power failure may result in inconsistent data and the corruption of stored data structures. In order to maintain data consistency in the presence of a power failure, a different approach must be taken in which persistent memory (which is all that is available for recovery after power failure) matches concurrent memory (which includes both caches and memory that are volatile) for designated operations, i.e., the concurrent view by a different thread is always synchronized with the recovery view by a recovery thread, should a power failure happens at any moment.

For example, in order to make lock-free data structures (such as hash tables and trees as used for indexing in databases) work with persistent memory, in addition to the atomic compare-and-swap (CAS) instruction for lock-free data structures (as with volatile memories), a cache-line flush followed by a data synchronization barrier is also needed to persist the data to the point-of-persistence for failure atomicity. The 'thread-safe' code snippet below illustrates the publishing of a new node to a singly linked list by atomically swinging a pointer.

```
1.    if(CAS(&last->next, next, node)) {
2.        FLUSH(&last->next);
3.        SYNC DATA;
4.    }
```

In the above code snippet, the instruction CAS in line 1 (block 106 in FIG. 1, for example) compares the pointer in the 'next' field of the last node (the first argument), with a previously read value (the second argument) and, if they match, the FLUSH instruction and SYNC_DATA (data synchronization) instruction are executed in lines 2 and 3, respectively (block 108 in FIG. 1, for example). The FLUSH instruction writes or flushes a line of a data cache containing a designated virtual address back to persistent memory or some other point of persistence. The SYNC_DATA instruction acts as a special kind of memory barrier in that no instruction in program order after the SYNC_DATA instruction executes until all explicit memory accesses before this instruction are complete and all cache, branch predictor and translation-lookaside-buffer (TLB) maintenance operations before this instruction are complete.

Even after the Conditional Store (CAS) is successful, events can still happen in between Line 1 and Line 2 in the code snippet above. For example, inconsistencies can arise due to write-after-read dependencies, where a thread persists a new value computed as the result of reading a value that might not have been persisted. An example of this problem is given below with reference to FIG. 2.

Figure 2:
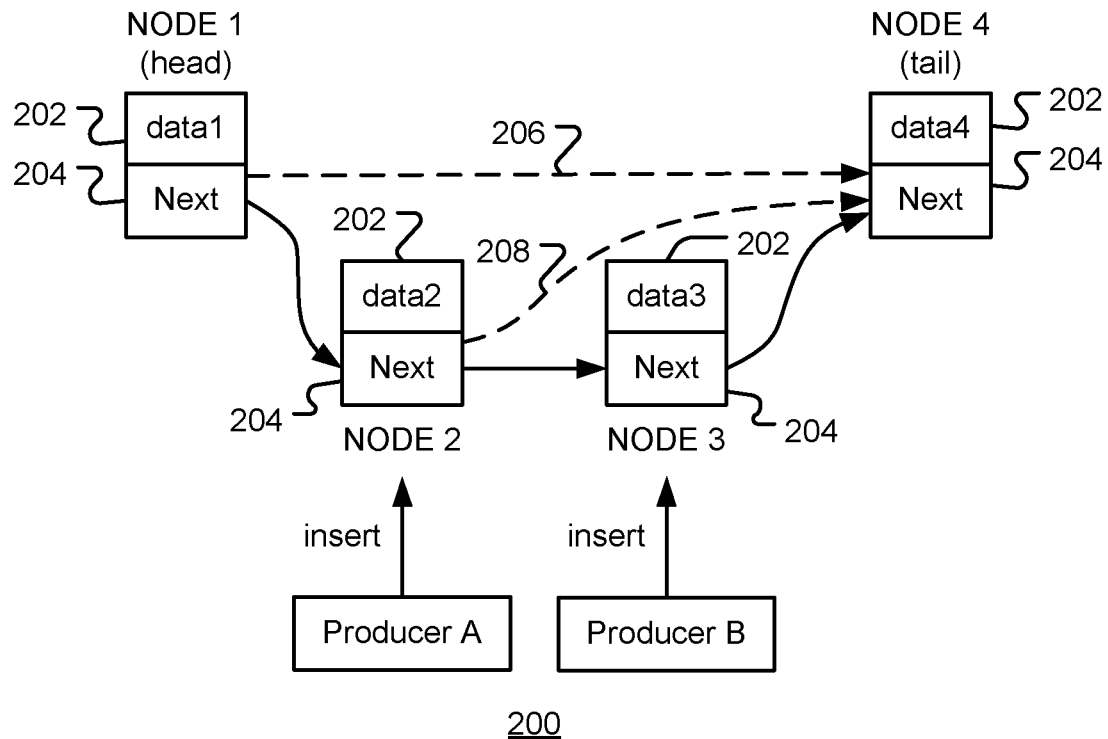
FIG. 2 is a diagrammatic representation of a linked list.

FIG. 2 is a diagrammatic representation of a linked list 200. Linked list 200 represents a sequence of nodes 1-4. Each node comprises data field 202 and pointer field 204 and is stored at a node address in memory. Pointer field 204 contains the address of the next node in the sequence and enables the data values in fields 202 to be accessed in a particular order.

Multiple execution threads may access linked list 200 and, in particular, may insert additional nodes. For instance, as illustrated in FIG. 2, node 2 is inserted by producer A after node 1, the 'next' pointer of node 1 gets atomically switched (CAS) from pointing to node 4 (broken line 206) to pointing to node 2, however, this CAS is not persisted yet. Then, node 3 gets inserted by producer B after node 2 and CAS atomically switches the 'next' pointer of node 2 from pointing to node 4 (broken line 208) to pointing to node 3, and this CAS gets persisted. If a power failure happens at this point before Line 2 for producer A, as the 'next' pointer from node 1 to node 2 has not been persisted, the application that uses the linked list would be left in an inconsistent state, with both node 2 and node 3 lost. Node 3 has been published but can't be recovered after a reboot, while other data may have been persisted that is dependent on node 3. As a result, subsequent accesses will not return valid data. In summary:

1) A inserts node 2 after node
2) A executes between Line 1 and Line 2, B inserts node 3, which goes after node 2
3) B publishes node 3, insertion successful
4) Power failure happens before Line 2 for A, node 2 gets unpublished, insertion by A unsuccessful
5) As a result of losing node 2, B also loses node 3, inconsistency after recovery for B.

The problem described above relates to lock-free linked lists with CAS for non-volatile memory (NVM). In addition, lock-free linked lists with CAS also suffer from two other problems: a) The concurrent insertion and deletion problem, where both nodes can be lost, similar to the problem above; b) The concurrent deletions of adjacent nodes problem, where the second deletion can be undone.

Moreover, the problem of ordering persists is not limited to persist CASs. For example, Linux file systems often creates files with holes by default, storage is physically allocated only at the time of actual writes to the file. For memory mapped files, there are implementations, such as demand paging, where not all memories are allocated when the memory map instruction is called. When a user-space application stores to a location in a memory-mapped direct access file (DAX file for example) with a 'hole', the store causes a page fault and the file system fills the hole with a new memory allocation. In the event of a power failure before the metadata changes are persisted, the file system metadata that gets updated by the page fault may not be flushed to persistence, even though user-space stores are flushed and persisted. Consequently, the application will be left in an inconsistent state. As a result, the recovered application, such as a database application, can crash upon accesses to the data stored onto the lost pages, since the stores to such pages would be lost even though the flushes had been performed.

A software solution to prevent data inconsistency as a result of power failure uses metadata to indicate whether X has been persisted or not, and
1) making the normal read 'IF X==1' into a persist read, i.e., if X has not been persisted, persist X first and then return the value of X, or
2) looping around read 'IF X==1 && Persisted' to wait until X is persisted.

These approaches overload all read operations, all read operations would pay the cost of checking whether the line has been persisted.

Instead of overloading reads with the burden to persist dirty data, and as reads are much more frequent than writes, the disclosed approach shifts the burden to writes, to make store exclusive instructions atomic with persist instructions.

In prior systems, an atomic operation is one that is indivisible or uninterruptable by other execution threads, processes, interrupts or signals. These are referred to herein as concurrent atomic instructions. In accordance with the present disclosure, persistent atomic instructions are introduced that have all of the properties of concurrent atomic instructions but, in addition, function indivisible or uninterruptable by a power failure. This is achieved by the introduction of instructions that write data back to a point of persistence and preventing observation of the data until the write back in completed.

A persistent atomic instruction may be implemented as a sequence of micro-operations. In accordance with the present disclosure, in the event of a power failure after a persistent atomic instruction has been issued, the data processing system will be recovered to state in which it appears that none of the micro-instructions have been executed or all of the micro-instructions have been executed. In this sense, the persistent atomic instruction is not divisible by a power failure.

For example, as part of an instruction set architecture, a 'Persistent Store Conditional' instruction may be introduced, denoted herein as 'STRP', to combine a store exclusive operation with a cache line clean to the point-of-persistence. This approach rules out such situations as described above by definition at the architectural level. The approach can be extended to any atomic instruction in an ISA that stores data, as well as to normal stores and stores with ordering semantics, i.e., store releases.

A persistent atomic instructions can be used as an alternative to Load-exclusive/Store-exclusive instructions, for example, to ease the implementation of atomic memory updates in very large systems. This could be in a closely coupled cache, sometimes referred to as near atomics, or further out in the memory system as far atomics. The persistent atomic instructions provide atomic update of register content with memory for a range of conditions, such as:

Compare and swap of 8-, 16-, 32-, 64- or a pair of 32- or 64-bit registers as a conditional update of a value in memory.

ADD, BitClear, ExclusiveOR, BitSet signed and unsigned MAXimum or MINimum value and other arithmetic logic unit (ALU) data processing operations on −8, 16-, 32- or 64-bit values in memory. These can occur with or without copying the original value in memory to a register.

Swap of an 8-, 16-, 32- or 64-bit value between a register and value in memory.

The instructions may also include controls associated with influencing the order properties, based on acquire and release semantics.

The sequel describes example implementations in which persistent atomic instructions are implemented in the microarchitecture of a data processing system as either strong persists (synchronous) or relaxed persists (asynchronous). Other implementations will be apparent to those of ordinary skill in the art. When a first execution thread in the data processing system issues a first store instruction associated with first data and a first address in a persistent memory of the data processing system, a sequence of actions is performed in which the first data is written to a cache of the data processing system and the first data is written to a point of persistence in the data processing system. Accesses associated with the first address in the persistent memory are monitored such that the first data is not available to other execution threads of the data processing system during performance of the sequence of actions. The point of persistence may be the persistent memory itself or a non-volatile buffer, for example.

Figure 3:
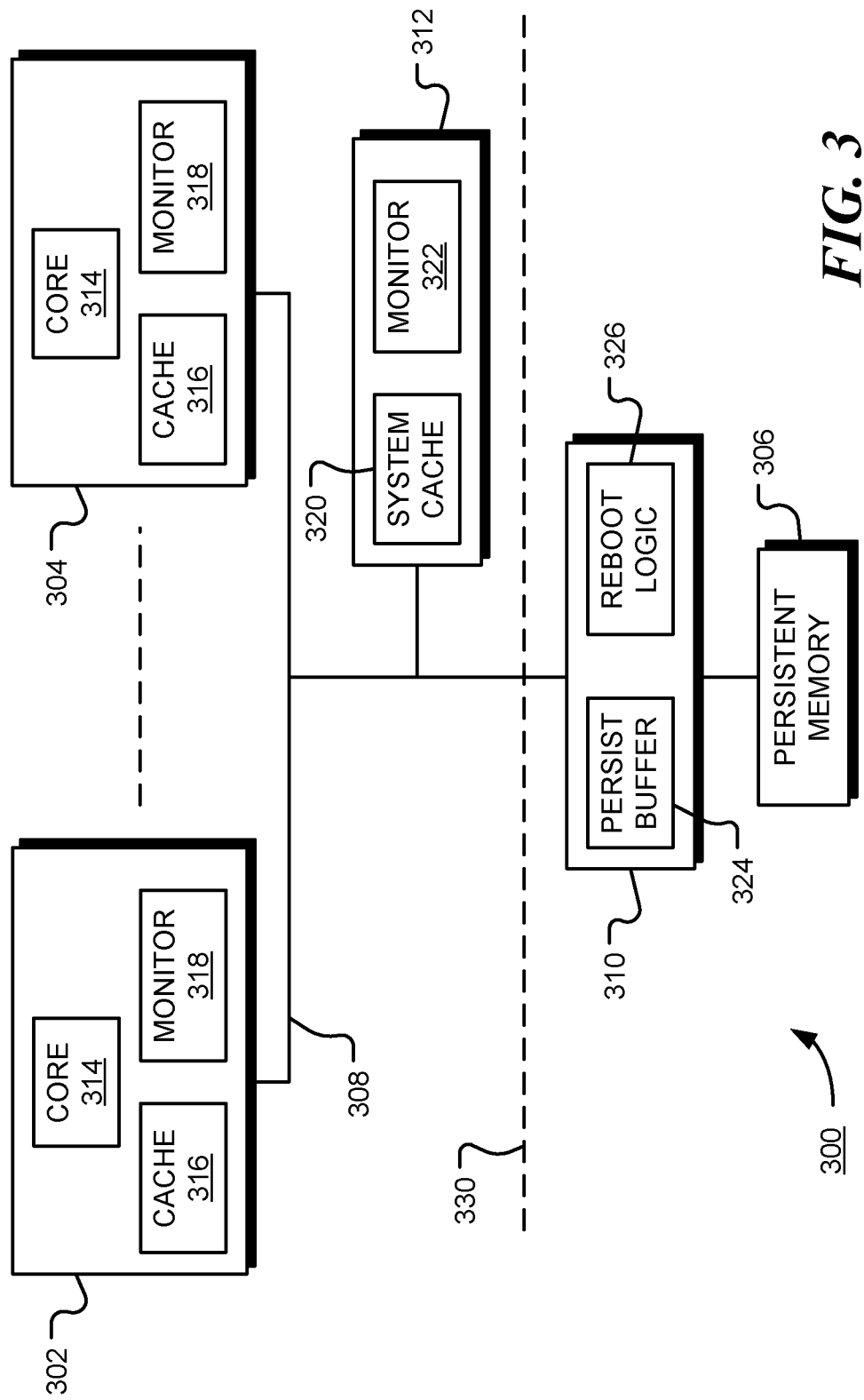
FIG. 3 is a diagrammatic representation of a data processing system, consistent with certain embodiments of the disclosure.

FIG. 3 is a diagrammatic representation of a data processing system 300 in accordance with an embodiment of the present disclosure. Referring to FIG. 3, processing devices 302 and 304 share a common data resource—persistent memory 306 in this embodiment. Any number of processing devices and data resources may be present. The processing devices access persistent memory 306 via an interconnect circuit 308 and a memory controller 310. Memory access requests by processing devices 302 and 304 are monitored and handled by logic 312 that may function as point of coherence for data and serialize memory access requests. A processing device, such as device 302 or device 304, may include one or more processing cores 314, one or more caches 316 and cache monitor/controller 318. Cache monitor/controller 318 may also be used to monitor the 'exclusive' status of addresses accessed.

In operation, core 314 may access data in local cache 316 or system cache 320, which is much more efficient than accessing persistent memory 306. However, caches 316 and 320 are volatile memories, whose contents will be lost during a power failure. Monitor 322 may control access to system cache 320 and persistent memory 306.

In accordance with an embodiment, the data processing system 300 is an apparatus comprising a processing device (302, 304) having a processing core 314 and a data cache 316, a persistent memory (306) accessible by the processing core, and a monitor (318, 322) configured to control access to data associated with a data address in the persistent memory dependent upon a first monitor state, in which access to the data is open to any execution thread operating on the processing device, and a second monitor state, in which access to the data is exclusive to a designated execution thread. Responsive to a first store instruction, issued by the processing core, to store first data at a first address in the persistent memory, the apparatus 300 is configured for setting the monitor state to the second state, putting a line of the cache in an exclusive state, updating the cache line with the first data, writing the first data to a point of persistence in the apparatus and setting the monitor state to the first monitor state following completion of writing the first data to a point of persistence in the apparatus. In one implementation of the synchronous approach, the point of persistent is the persistent memory 306. In asynchronous approach, the point of persistence is a persist buffer 324, in which case reboot logic 326 may be configured for writing the contents of the persist buffer 324 to the persistent memory 306 following a reboot of the apparatus. Alternatively, persist buffer 324 may be copied to the persistent memory using a backup power source in the event of power failure. These approaches are described in more detail below.

In FIG. 3, all storage locations are accessible during concurrent operation and a combination of a coherence protocol and concurrent atomic instructions may be used to maintain data consistency. In normal operation, key data will be stored in persistent memory below broken line 330 when requested, when data is evicted from a cache, when threads or processes have completed or the data processing is powered down. However, in the event of a power failure, the contents of storage locations above broken line 330 will be lost. The persistent atomic instructions of the present disclosure ensure that designated data is placed in persistent storage below broken line 330. This data is available for data recovery after a power failure.

Synchronous Approach

In one embodiment of a synchronous implementation, a state machine in monitor/controller 322 is used to monitor data accesses to persistent memory 306 and/or system cache 320. Similarly, a state machine in cache monitor/controller 318 monitors and controls access to local cache 316. The state of a memory region may be maintained at different levels of granularity. In a data cache, a coherence state is maintained for each line of the cache. A MOESI coherence protocol (with modified, owned, exclusive, shared and invalid states) may be used, for example. The monitor state ('open' or 'exclusive') may be maintained at the same level of granularity (and may share the same states) or may have a different level of granularity. For example, in this embodiment of the synchronous approach, the persistent store conditional instruction (STRP) is converted into two micro-operations: a 'store exclusive' instruction followed by a 'clean to point of persistence (PoP)' instruction. The 'store exclusive' operation sets the state of a memory location to 'exclusive', preventing other threads from accessing the location. The location remains in this state until the clean to PoP operation is completed, at which time the state is reset to 'open'. In a conventional implementation, the state of the memory location would be reset to 'open' upon successful completion of the 'store exclusive' operation. The PoP may be persistent memory 306. A 'load exclusive' instruction may also be provided that loads data from a specified memory location (provided that location is 'open') and causes the state of the location to be set to 'exclusive'.

In the embodiment described above, one or more monitors are used to restrict access to data designated as 'exclusive'. These monitors may be placed at various logical positions within the hardware of a data processing system. Each processing core may have its own local monitor and a system may have one or more global monitors, each associated with an address region. The shareable and cacheable attributes of the address translation table entry, relating to the location used for the exclusive load or store instruction, determines which exclusive monitor is used. A local monitor may be used, for example, when the location used for the exclusive access is marked as non-shareable, that is, threads running on the same core only.

Access may be controlled at various levels of granularity. For example, access may be controlled by byte, word, cache line, page, etc.

Figure 4:
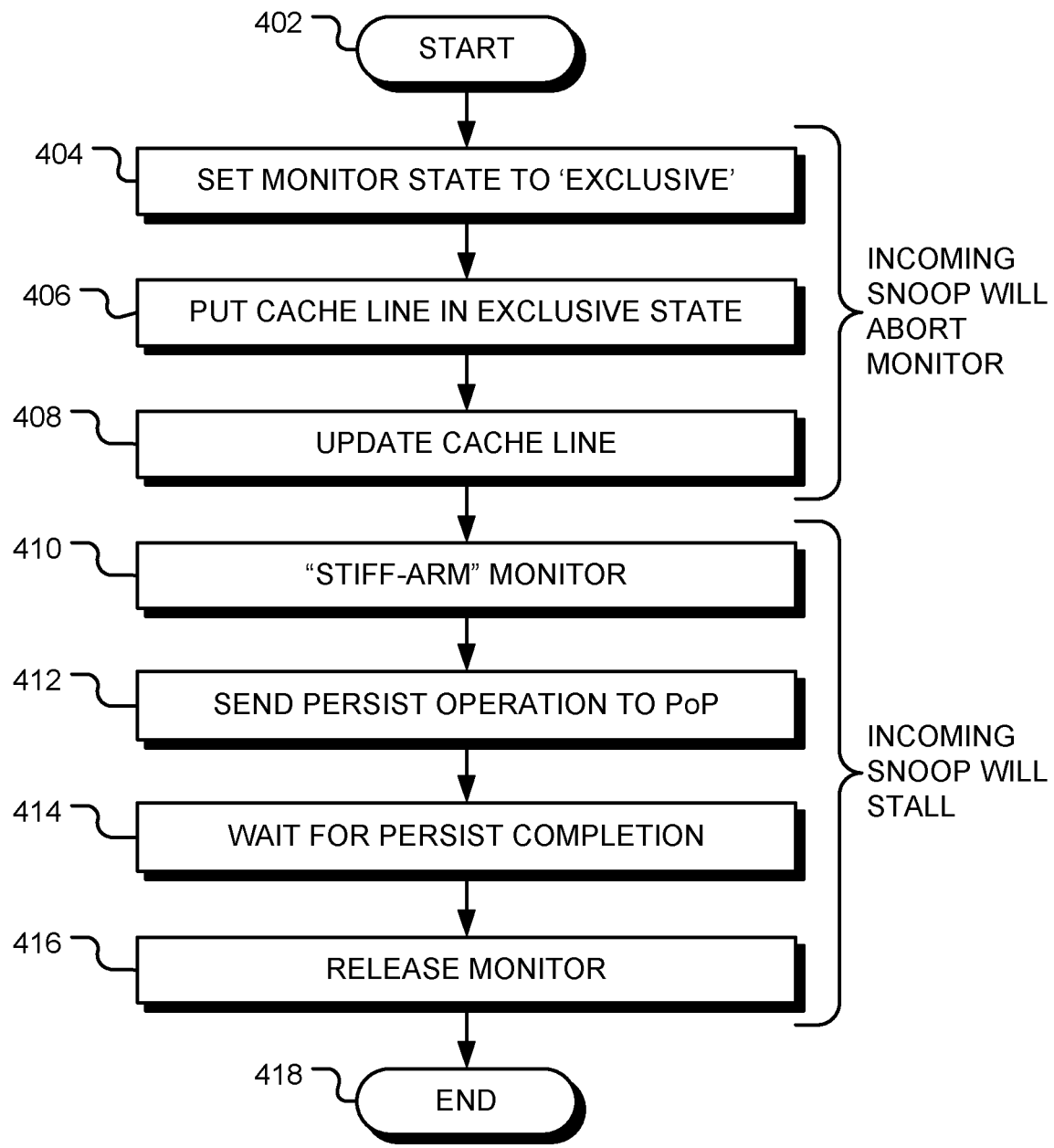
FIG. 4 is a flow chart of an example embodiment of a persistent store instruction, consistent with certain embodiments of the disclosure.

FIG. 4 is a flow chart 400 of an embodiment a STRP instruction, consistent with embodiments of the disclosure. Following start block 402 in FIG. 4, the monitor state is set to 'exclusive' at block 404. At block 406, the cache line, in a cache of a processor, containing the data is set to an exclusive state and is updated at block 408. During these operations, an incoming snoop request to processor will abort the monitor. At block 410, the monitor is configured ("stiff-armed") such that an incoming snoop request will stall until the monitor is released. At block 412 the data is sent to the PoP. The operation waits at block 414 until the persist operation is complete and then, at block 416, the monitor is released. The processor can then respond to any stalled snoop request. The STRP operation is then complete, as indicated by termination block 418. In this manner, an incoming snoop request will either get data prior the STRP operation or will get new data that has been persisted.

Asynchronous Approach

In a further embodiment, writing back to persistent memory is performed asynchronously. In this asynchronous implementation, the STRP instruction will:

1) push 'store exclusive' cache-lines into a persist buffer. This may be a first-in-first-out (FIFO), for example. However, the buffer doesn't need to be a FIFO that enforces strict order of each persists; it can be a buffer that keeps the happens-before relations of dependent persists (e.g., Y happens before Z), but otherwise allows reordering of other persists) so they are guaranteed to be persisted in order,
2) change the monitor 'exclusive' status back to 'open' once the cache-line is pushed into the persist buffer, and
3) persist the data asynchronously without blocking the progress of store exclusive instructions.

In one embodiment, the persist buffer 324 is a write pending queue in memory controller 310. Persist buffer is a non-volatile buffer can be implemented using with non-volatile memory (such as STT-MRAM) or a volatile memory, such as battery backed RAM, that is backed-up using an external energy source. In the asynchronous embodiment, the persist buffer is the point-of-persistence (PoP). In the event of power failure, the non-volatile buffer stores the data until power is resumed. The buffer is then drained to persistent memory. To this end, data processing system 300 can include reboot logic 326. Following a reboot of the system, reboot logic 326 copies data in buffer 324 to persistent memory 306.

In the event of a power failure, the volatile buffer's contents will be drained with the backup energy source upon power failure, from buffer 324 to persistent memory 306. The data will remain consistent.

Other elements of the data processing system have been omitted from FIG. 3 for the sake of clarity.

It will be apparent to those of ordinary skill in the art that the Persistent Store Conditional (STRP) instruction may be implemented in other ways without departing from the present disclosure.

Figure 5:
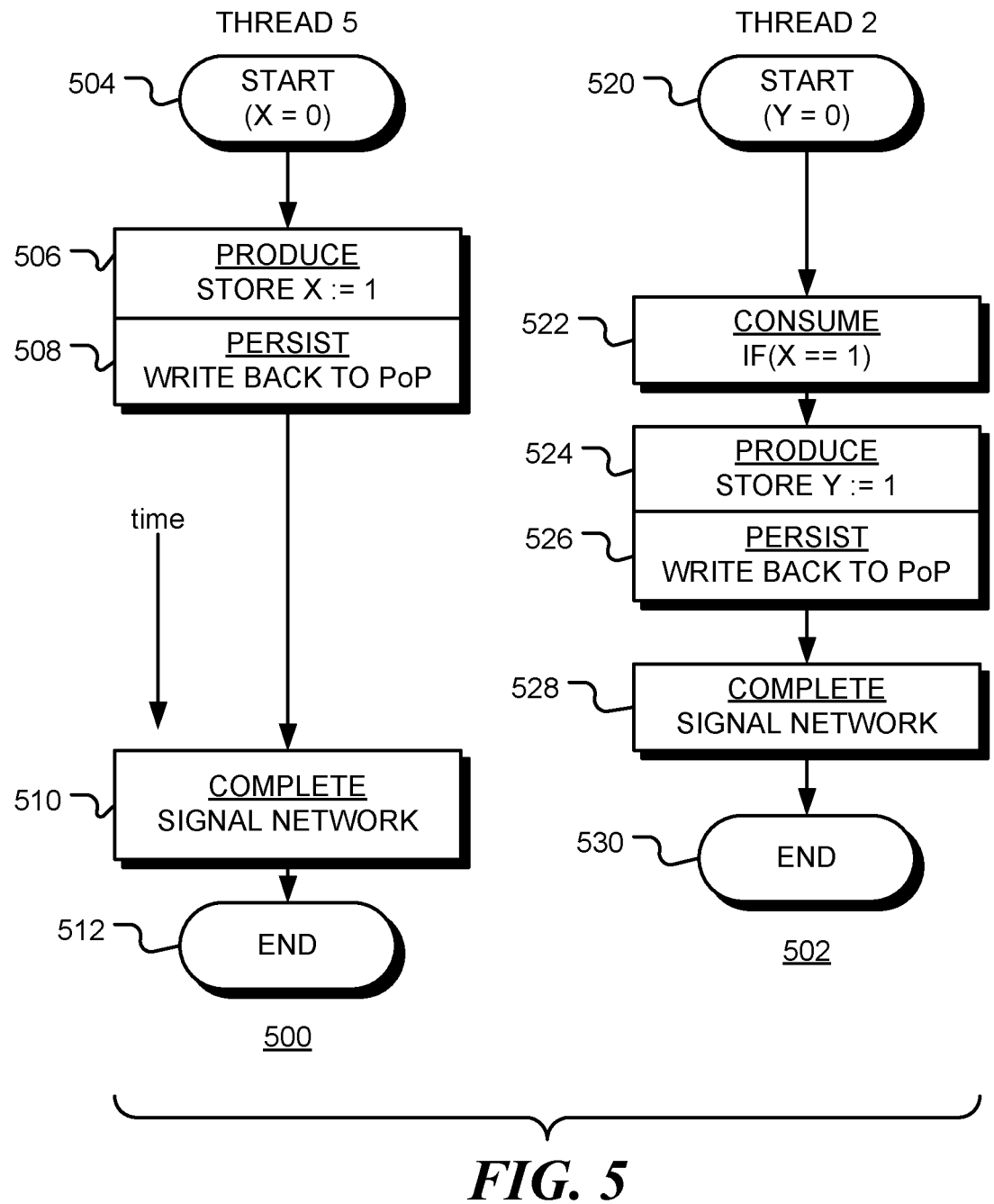
FIG. 5 is a diagrammatic representation of operations performed by two execution threads in a data processing system that utilizes persistent memory, consistent with certain embodiments of the disclosure.

FIG. 5 is a diagrammatic representation of operations performed by two execution threads (THREAD 1 and THREAD 2) in a data processing system that utilizes persistent memory, such as Resistive Random Access Memory (ReRAM), phase change memory (PCM), and spin-transfer torque magnetic RAM (STT-MRAM). Flow 500 illustrates the operations of THREAD 1, with time flowing downwards as indicated by the arrow, while flow 502 illustrates the operations of THREAD 2. At start block 504, a data value X has a value 0 in a persistent memory. At block 506, THREAD 1 produces a new value (1) for X. This new value is persisted at block 508. These operations are performed atomically using the STRP instruction, for example, to store the value 1 to the address X. This is an atomic instruction and writes the value of X back to a Point of Persistence (PoP), such as the persistent memory or a persistence buffer. The value may also be written to one or more caches for future use, depending upon the cache policy implemented in the system. Optionally, once the write-back has completed, i.e. the data has been persisted, the data processing system may be signaled at block 510. The operation of THREAD 1 ends at block 512.

Turning to operation 502 of the THREAD 2, at start block 520, a data value Y has a value 0 in a persistent memory. At block 522, THREAD 2 reads the value of X and compares it to unity. If this operation occurs before operation 506, the value of X will be zero and Y will not be set. If operation 522 occurs after operation 508, THREAD 2 produces a new value for Y at block 524. An operation 522 issued after operation 506 but before operation 508 has completed may be stalled or cause operation 506 and 508 to be aborted. The new value for Y is written back to the PoP at block 526. Operations 524 and 526 may be implemented as a single persistent atomic instruction, such as STRP for example, which write the values 1 to the location Y. Optionally, THREAD 2 may signal completion at block 528. The operation of THREAD 2 ends at block 530. Since operation 506 and operation 508 are performed using a single persistent atomic operation, the result X=0, Y=1 cannot occur even if a power failure occurs. If a power failure occurs before block 526, THREAD 2 will set Y to the value 0 when the thread is next executed.

In addition to avoiding inconsistencies, as illustrated in the example above, the Persistent Store Conditional (STRP) instruction can also simplify porting lock-free data structures to non-volatile memory (NVM). The code snippets below show how the implementation of the 'enqueue' operation of a durable linked list can be simplified and made consistent in the event of a failure. LISTING 1 shows an implementation using a combination of CAS and FLUSH instructions.

```
LISTING 1:
void enqueue(T value) {
    Node* node = new Node (value);
    FLUSH (node);
```

```
-continued while (true) {
        Node* last = tail;
        Node* next = last->next;
        if(last == tail) {
            if(next == NULL) {
                if(CAS(&last->next, next, node)) {
                    // gap between CAS and FLUSH
                    FLUSH(&last->next);
                    CAS(&tail, last, node);
                    return;
                }
            } else {
                FLUSH(&last->next);
                CAS(&tail, last, next)
            }
        }
    }
}
```

For proper execution, the CAS and FLUSH operations must be ordered correctly.

In accordance with embodiments of the present disclosure, an ISA primitive instruction, denoted as 'PCAS' for persistent compare and swap', is provided. In one embodiment, the PCAS operation implements the function in LISTING 2 below.

```
LISTING 2
bool PCAS (address, old_value, new_value) {
    current_value = load_exclusive (address) // sets monitor to
    'exclusive'
    if( current_value == old_value) {
        STRP ( address, new_value ) // stores to PoP and sets
                                    // monitor to 'open' when done
        return (true)      // success
    }
    else{
        return (false)     // failure
    }
}
```

In an alternative implementation, provided in LISTING 3 below, the line can be loaded as 'open' in contended cases, where most compare operations (by concurrent threads) will fail, to allow such compare operations to fail quickly. Only a successful compare operation will upgrade the line to exclusive before write.

```
LISTING 3
bool PCAS (address, old value, new value) {
    current_value = load_open (address) // load the value as 'open'
    if( current_value == old_value) {
        upgrade_exclusive (address) //upgrade from 'open' to 'exclusive'
        STRP ( address, new_value ) // stores to PoP and sets
                                    // monitor to 'open' when done
        return (true)      // success
    }
    else {
        return (false)     //failure
    }
}
```

With this new instruction, the enqueue operation can be simplified, as shown in LISTINGS 2 and 3, with only a trivial change being needed to make a normal queue durable.

```
LISTING 4:
void enqueue(T value) {
    Node* node = new Node (value);
    FLUSH (node);
    while (true) {
        Node* last = tail;
        Node* next = last->next;
        if(last == tail) {
            if(next == NULL) {
                if(PCAS(&last->next, next, node)) {
                    CAS(&tail, last, node);
                    return;
                }
            } else {
                CAS(&tail, last, next)
            }
        }
    }
}
```

Figure 6:
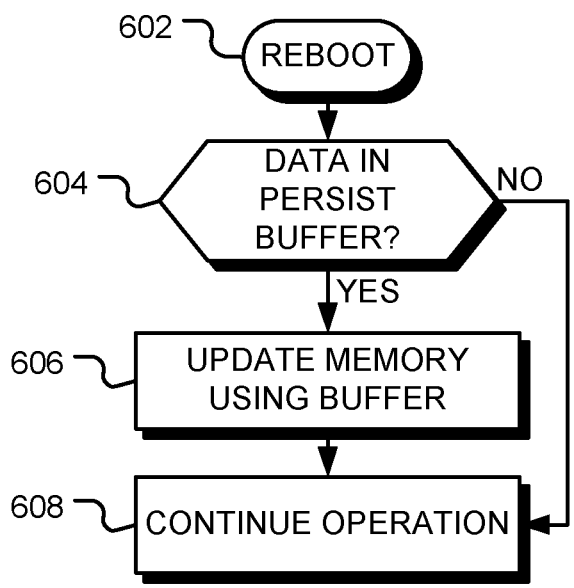
FIG. 6 is a flow chart of a method implemented following a reboot of a data processing system, consistent with certain embodiments of the disclosure.

FIG. 6 is a flow chart of a method 600 implemented following a reboot of a data processing system after a power failure or other fault, where the data processing implements the store to persistent memory using an asynchronous approach. Following reboot at start block 602, a check is made at decision block 604 to determine if the non-volatile persist buffer contains data. If it does, as depicted by the positive branch from decision block 604, the persistent memory is updated at block 606 using the data in the persist buffer. Once the persistent memory has been updated, normal operation is continued at block 608. Otherwise, as depicted by the negative branch from decision block 604, normal operation is continued at block 608. To this end, data processing system 300 includes reboot logic 326. Following a reboot of the system, reboot logic 326 copies and data in buffer 324 to persistent memory 306.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

Although illustrative embodiments have been described in detail herein with reference to the accompanying drawings, it is to be understood that the principles disclosed herein are not limited to those precise embodiments, and that various changes and modifications can be effected therein by one skilled in the art without departing from the appended claims.

It will be appreciated that the devices, systems, and methods described above are set forth by way of example and not of limitation. Absent an explicit indication to the contrary, the disclosed steps may be modified, supplemented, omitted, and/or re-ordered without departing the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A method comprising: responsive to a persistent atomic instruction issued by a first execution thread in a data processing system, the persistent atomic instruction associated with a first address in a persistent memory of the data processing system, performing a sequence of actions associated with the persistent atomic instruction; and writing first data to a point of persistence in the data processing system, where the first data is produced by the sequence of actions or is associated with the persistent atomic instruction; controlling accesses associated with the first address in the persistent memory such that the first data is not available to other execution threads of the data processing system until completion of writing the first data to the point of persistence in the data processing system.

2. The method of item 1, where the point of persistence comprises the persistent memory of the data processing system.

3. The method of item 1, where the point of persistence comprises a non-volatile persist buffer, the method further comprising: copying contents of the non-volatile persist buffer to the persistent memory following supply of power to the data processing system.

4. The method of item 1, where the point of persistence comprises a volatile persist buffer, the method further comprising: draining the contents in the volatile persist buffer to the persistent memory upon power failure using a backup energy source.

5. The method of item 1, where the point of persistence comprises a persist buffer, the method further comprising: copying contents of the persist buffer to the persistent memory, where the copying is not synchronized with the completion of the persistent atomic instruction.

6. The method of item 1, further comprising, responsive to the persistent atomic instruction: setting a monitor state to indicate that access to data associated with the first address is exclusive to the first execution thread; and setting the monitor state to indicate that access to data associated with the first address is open to other execution threads following completion of writing the first data to the point of persistence in the data processing system.

7. The method of item 6, where monitoring accesses associated with the first address in the persistent memory comprises determining the monitor state associated with the first address.

8. The method of item 1, further comprising writing the first data to a cache of the data processing system, where writing the first data to the point of persistence in the data processing system comprises: requesting write-back of a region of the cache storing the first data to the point of persistence.

9. The method of item 1, further comprising writing the first data to a cache of the data processing system, where writing the first data to the point of persistence in the data processing system comprises:
cleaning a line of the cache that contains the first data, to the point of persistence.

10. The method of item 1, where execution of the persistent atomic instruction includes one or more operations selected from a group of operations consisting of: a store operation; a compare and store operation; a compare and swap operation; a swap operation; a logic operation; an arithmetic operation; and an ordering barrier operation.

11. A method comprising: executing, responsive to a persistent atomic instruction issued by a first execution thread in a data processing system, a first store operation associated with first data and a first address in a persistent memory of the data processing system, where a monitor of the data processing system controls access to data associated with the address in the persistent memory dependent upon a first monitor state, in which access to the first data is open to any execution thread operating in the data processing system, and a second monitor state, in which access to the data is exclusive to a designated execution thread; responsive the first store operation, performing a sequence of actions comprising: setting the monitor state to the second state; putting a line of a cache of the data processing system into an exclusive state of a coherence protocol; updating the cache line with the first data; writing the first data to a point of persistence in the apparatus; and setting the monitor state to the first monitor state following completion of writing the first data to a point of persistence in the apparatus, where the point of persistent is in the persistent memory or in a persist buffer of the data processing system.

12. The method of item 11, where writing the first data to a point of persistence in the data processing system comprises: cleaning a line of the cache, the line containing the first data, to the point of persistence.

13. The method of item 11, further comprising, responsive to a request to access the first data: when the monitor state is the first state, allowing access to the first data; when the monitor state is the second state and writing the first data to a point of persistence in the apparatus has not begun, aborting execution of the first store operation; and when the monitor state is the second state and writing the first data to a point of persistence in the apparatus has commenced, stalling or aborting the request to access the first data.

14. The method of item 11, further comprising, responsive to a request to access the first data: when the monitor state is the first state, allowing access to the first data; and when the monitor state is the second state stalling or aborting execution of the first store operation.

15. The method of item 11, further comprising, when the point of persistence comprises the persist buffer: copying contents of the persist buffer to the persistent memory following supply of power to the data processing system when the persist buffer is non-volatile, and draining the contents in the persist buffer to the persistent memory upon power failure with a backup energy source when the persist buffer is volatile.

16. The method of item 11, where the first store operation is performed in response to persistent atomic instruction.

17. The method of item 16, where execution of the persistent atomic instruction includes one or more operations selected from a group of operations consisting of: the first store operation; a compare and store operation; a compare and swap operation; a swap operation; a logic operation; an arithmetic operation; and an ordering barrier operation.

18. An apparatus comprising: a processing device comprising a processing core and a data cache; a persistent memory accessible by the processing device; and a monitor configured to control access to data associated with a data address in the persistent memory dependent upon a first monitor state, in which access to the data is open to any execution thread operating on the processing device, and a second monitor state, in which access to the data is exclusive to a designated execution thread; where, responsive to a persistent atomic instruction issued by the processing core, the apparatus is configured for: generating a first store operation to store first data at a first address in the persistent memory; setting the monitor state to the second state; putting a line of the cache in an exclusive state; updating the cache line with the first data; writing the first data to a point of persistence in the apparatus; and setting the monitor state to the first monitor state following completion of writing the first data to a point of persistence in the apparatus, where the point of persistent comprises the persistent memory or a persist buffer of the data processing system.

19. The method of item 18, where responsive to the persistent atomic instruction issued by the processing core, the apparatus is further configured for executing one or more operations selected from a group of operations consisting of: the first store operation; a compare and store operation; a compare and swap operation; a swap operation; a logic operation; an arithmetic operation; and an ordering barrier operation.

20. The apparatus of item 18, further comprising the persist buffer and reboot logic, where the reboot logic is configured to: write the contents of the persist buffer to the persistent memory following a reboot of the apparatus when the point of persistence is the persist buffer and the persist buffer is non-volatile 21. The apparatus of item 18, further comprising the persist buffer and a backup energy source, where the reboot logic is configured to: write the contents of the persist buffer to the persistent memory following a power failure of the apparatus when the point of persistence is the persist buffer and the persist buffer is volatile 22. The apparatus of item 18, where the monitor comprises a local monitor associated with the data cache of the processing device, the apparatus further comprising a global monitor associated with the persistent memory.

23. The apparatus of item 18, further comprising a memory controller, where the persistent memory is accessed via a memory controller and where the memory controller comprises the persist buffer.

24. The apparatus of item 18, where the persistent memory is a Correlated Electron Random Access Memory (CeRAM), a Resistive Random Access Memory (ReRAM), a Phase Change Memory (PCM), or Spin-Transfer Torque Magnetic Random Access Memory RAM (STT-MRAM).

25. A non-transient computer readable medium containing instructions of a hardware description language descriptive of the apparatus of item 18.

26. A non-transient computer readable medium containing a netlist description of the apparatus of item 18.

The invention claimed is:

1. A method comprising:
responsive to a persistent atomic instruction issued by a first execution thread in a data processing system, the persistent atomic instruction associated with a first address in a persistent memory of the data processing system:
  performing a sequence of actions associated with the persistent atomic instruction; and
  writing first data to a point of persistence in the data processing system, where the point of persistence comprises a persist buffer and the first data is produced by the sequence of actions or is associated with the persistent atomic instruction;
controlling accesses associated with the first address in the persistent memory such that the first data is not available to other execution threads of the data processing system until completion of writing the first data to the point of persistence in the data processing system; and
copying contents of the persist buffer to the persistent memory, where the copying is not synchronized with the completion of the persistent atomic instruction.

2. The method of claim 1, where the persist buffer is a non-volatile persist buffer, the method further comprising:
copying contents of the non-volatile persist buffer to the persistent memory following supply of power to the data processing system.

3. The method of claim 1, where the persist buffer is a volatile persist buffer, the method further comprising:
draining the contents in the volatile persist buffer to the persistent memory upon power failure using a backup energy source.

4. The method of claim 1, further comprising writing the first data to a cache of the data processing system, where writing the first data to the point of persistence in the data processing system comprises:
requesting write-back of a region of the cache storing the first data to the point of persistence.

5. The method of claim 1, where execution of the persistent atomic instruction includes one or more operations selected from a group of operations consisting of:
a store operation;
a compare and store operation;
a compare and swap operation;
a swap operation;
a logic operation;
an arithmetic operation; and
an ordering barrier operation.

6. A method comprising:
responsive to a persistent atomic instruction issued by a first execution thread in a data processing system, the persistent atomic instruction associated with a first address in a persistent memory of the data processing system,
  performing a sequence of actions associated with the persistent atomic instruction;
  writing first data to a cache of the data processing system; and
  writing the first data to a point of persistence in the data processing system; and
  controlling accesses associated with the first address in the persistent memory such that the first data is not available to other execution threads of the data processing system until completion of writing the first data to the point of persistence in the data processing system,
where the first data is produced by the sequence of actions or is associated with the persistent atomic instruction; and
where writing the first data to the point of persistence in the data processing system comprises:
  cleaning a line of the cache that contains the first data, to the point of persistence.

7. The method of claim 6, where the point of persistence is in the persistent memory of the data processing system.

8. The method of claim 6, further comprising, responsive to the persistent atomic instruction:
setting a monitor state to indicate that access to data associated with the first address is exclusive to the first execution thread; and
setting the monitor state to indicate that access to data associated with the first address is open to other execution threads following completion of writing the first data to the point of persistence in the data processing system.

9. The method of claim 8, where monitoring accesses associated with the first address in the persistent memory comprises determining the monitor state associated with the first address.

10. A method comprising:
executing, responsive to a persistent atomic instruction issued by a first execution thread in a data processing system, a first store operation associated with first data and a first address in a persistent memory of the data processing system, where a monitor of the data processing system controls access to data associated with the address in the persistent memory dependent upon a first monitor state, in which access to the first data is open to any execution thread operating in the data processing system, and a second monitor state, in which access to the data is exclusive to a designated execution thread;
responsive the first store operation, performing a sequence of actions comprising:
  setting the monitor state to the second state;
  putting a line of a cache of the data processing system into an exclusive state of a coherence protocol;
  updating the cache line with the first data;
  writing the first data to a point of persistence in the apparatus; and
  setting the monitor state to the first monitor state following completion of writing the first data to a point of persistence in the apparatus,
where the point of persistent is in the persistent memory or in a persist buffer of the data processing system.

11. The method of claim 10, where writing the first data to a point of persistence in the data processing system comprises:
cleaning a line of the cache, the line containing the first data, to the point of persistence.

12. The method of claim 10, further comprising, responsive to a request to access the first data:
when the monitor state is the first state, allowing access to the first data;

when the monitor state is the second state and writing the first data to a point of persistence in the apparatus has not begun, aborting execution of the first store operation; and when the monitor state is the second state and writing the first data to a point of persistence in the apparatus has commenced, stalling or aborting the request to access the first data.

13. The method of claim 10, further comprising, responsive to a request to access the first data:

when the monitor state is the first state, allowing access to the first data; and when the monitor state is the second state stalling or aborting execution of the first store operation.

14. The method of claim 10, further comprising, when the point of persistence comprises the persist buffer:

copying contents of the persist buffer to the persistent memory following supply of power to the data processing system when the persist buffer is non-volatile, and draining the contents in the persist buffer to the persistent memory upon power failure with a backup energy source when the persist buffer is volatile.

15. The method of claim 10, where the first store operation is performed in response to persistent atomic instruction.

16. An apparatus comprising:

a processing device comprising a processing core and a data cache;

a persistent memory accessible by the processing device; and a monitor configured to control access to data associated with a data address in the persistent memory dependent upon a first monitor state, in which access to the data is open to any execution thread operating on the processing device, and a second monitor state, in which access to the data is exclusive to a designated execution thread;

where, responsive to a persistent atomic instruction issued by the processing core, the apparatus is configured for:

generating a first store operation to store first data at a first address in the persistent memory;

setting the monitor state to the second state;

putting a line of the cache in an exclusive state;

updating the cache line with the first data;

writing the first data to a point of persistence in the apparatus; and setting the monitor state to the first monitor state following completion of writing the first data to a point of persistence in the apparatus, where the point of persistent comprises the persistent memory or a persist buffer of the data processing system.

17. The apparatus of claim 16, further comprising the persist buffer and reboot logic, where the reboot logic is configured to:

write the contents of the persist buffer to the persistent memory following a reboot of the apparatus when the point of persistence is the persist buffer and the persist buffer is non-volatile.

18. The apparatus of claim 16, further comprising the persist buffer and a backup energy source, where the reboot logic is configured to:

write the contents of the persist buffer to the persistent memory following a power failure of the apparatus when the point of persistence is the persist buffer and the persist buffer is volatile.

19. The apparatus of claim 16, where the monitor comprises a local monitor associated with the data cache of the processing device, the apparatus further comprising a global monitor associated with the persistent memory.

20. The apparatus of claim 16, further comprising a memory controller, where the persistent memory is accessed via a memory controller and where the memory controller comprises the persist buffer.

21. A non-transitory computer readable medium containing instructions of a hardware description language descriptive of the apparatus of claim 16.

* * * * *